(12) United States Patent
Ziaja et al.

(10) Patent No.: US 11,439,910 B2
(45) Date of Patent: *Sep. 13, 2022

(54) AUDIENCE ADJUSTED GAMING

(71) Applicant: eBay Inc., San Jose, CA (US)

(72) Inventors: Jason Ziaja, Cedar Park, TX (US); Bryan Genepang Luk, Round Rock, TX (US); Yu Tang, Round Rock, TX (US); Christopher Diebold O'Toole, Cedar Park, TX (US); Robert He, Pflugerville, TX (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,911

(22) Filed: Dec. 7, 2020

(65) Prior Publication Data
US 2021/0113926 A1    Apr. 22, 2021

Related U.S. Application Data

(63) Continuation of application No. 16/197,302, filed on Nov. 20, 2018, now Pat. No. 10,857,466, which is a continuation of application No. 14/585,089, filed on Dec. 29, 2014, now Pat. No. 10,155,167.

(51) Int. Cl.
*A63F 13/67* (2014.01)
*A63F 13/86* (2014.01)

(52) U.S. Cl.
CPC .............. *A63F 13/67* (2014.09); *A63F 13/86* (2014.09); *A63F 2300/535* (2013.01)

(58) Field of Classification Search
USPC .......................................................... 463/31
See application file for complete search history.

(56) References Cited

U.S. PATENT DOCUMENTS

| | | | |
|---|---|---|---|
| 7,824,268 B2 * | 11/2010 | Harvey | A63F 13/12 463/9 |
| 10,155,167 B2 | 12/2018 | Ziaja et al. | |
| 10,857,466 B2 | 12/2020 | Ziaja et al. | |
| 2007/0279494 A1 * | 12/2007 | Aman | H04N 5/278 348/169 |
| 2008/0146342 A1 | 6/2008 | Harvey et al. | |
| 2014/0100034 A1 * | 4/2014 | Chung | H04N 21/4781 463/31 |
| 2016/0184708 A1 | 6/2016 | Ziaja et al. | |
| 2016/0381110 A1 * | 12/2016 | Barnett | H04N 21/42203 709/231 |
| 2017/0003740 A1 * | 1/2017 | Verfaillie | A63F 13/87 |
| 2017/0003784 A1 * | 1/2017 | Garg | A63F 13/87 |

(Continued)

OTHER PUBLICATIONS

Final Office Action received for U.S. Appl. No. 14/585,089, dated May 30, 2018, 10 pages.

(Continued)

*Primary Examiner* — Pierre E Elisca
(74) *Attorney, Agent, or Firm* — Holland & Hart LLP

(57) ABSTRACT

A system and method includes a first device with one or more processors coupled to a memory that executes instructions from the memory to perform the steps of receiving a request to begin a videogame; streaming video of the videogame to an audience; determine a popularity of the streaming video; and changing the videogame mechanics based on the popularity of the streaming video.

20 Claims, 6 Drawing Sheets

(56) References Cited

U.S. PATENT DOCUMENTS

2017/0006074 A1* 1/2017 Oates, III ............. H04N 21/472
2019/0083888 A1   3/2019 Ziaja et al.

OTHER PUBLICATIONS

Non-Final Office Action received for U.S. Appl. No. 14/585,089, dated Apr. 17, 2017, 7 pages.
Notice of Allowance received for U.S. Appl. No. 14/585,089, dated Aug. 13, 2018, 9 pages.
Non-Final Office Action Received for U.S. Appl. No. 16/197,302, dated Apr. 9, 2020, 7 pages.
Notice Of Allowance received for U.S. Appl. No. 16/197,302, dated Aug. 6, 2020, 9 Pages.

* cited by examiner

AUDIENCE ADJUSTED GAMING

RELATED APPLICATIONS

This application is a continuation of U.S. patent application Ser. No. 16/197,302, filed Nov. 20, 2018, entitled, "Audience Adjusted Gaming," which is a continuation of U.S. patent application Ser. No. 14/585,089, filed Dec. 29, 2014, which are incorporated herein by reference in its entirety.

BACKGROUND

Field of the Disclosure

The present disclosure generally relates to gaming mechanics particularly to systems and methods for audience adjusted gaming mechanics.

RELATED ART

With the availability of live video recording and streaming over the internet, a large market for video game recordings and streams has developed. Some video games have developed in a similar fashion as sports where the players are able to earn a living by playing video games competitively. Competitive video gaming is sometimes being referred to as electronic sports or e-sports. Other avenues of professional video gaming also include individuals providing video replays and/or streams of tutorials, reviews, commentary, competition breakdowns, video game play through, general playing, and/or the like. Many gamers (people who play video games) are able to earn money through ad revenue generated from streaming video channels that the gamer has created. Popular websites for creating channels include Youtube® and Twitch®. These gamers usually get paid based on a combination of number of subscribers and views. In some cases, these gamers also are able to earn additional funds through donations, sponsorships, making live appearances, and/or the like. Generally, the more views a gamer is getting on their channel the more revenue the gamer can generate through ads, sponsorships, and/or the like.

Currently technology in the game streaming area is under developed. Beyond adding chat and message abilities, video games are streamed on the audience's monitor and/or television for viewing. Interactive elements have not been widely introduced. Adding in features to increase audience engagement may increase viewership, benefiting the gaming industry as a whole. Thus a system and method for adjusting video game mechanics to pander to its audience would be beneficial.

Figure 1:
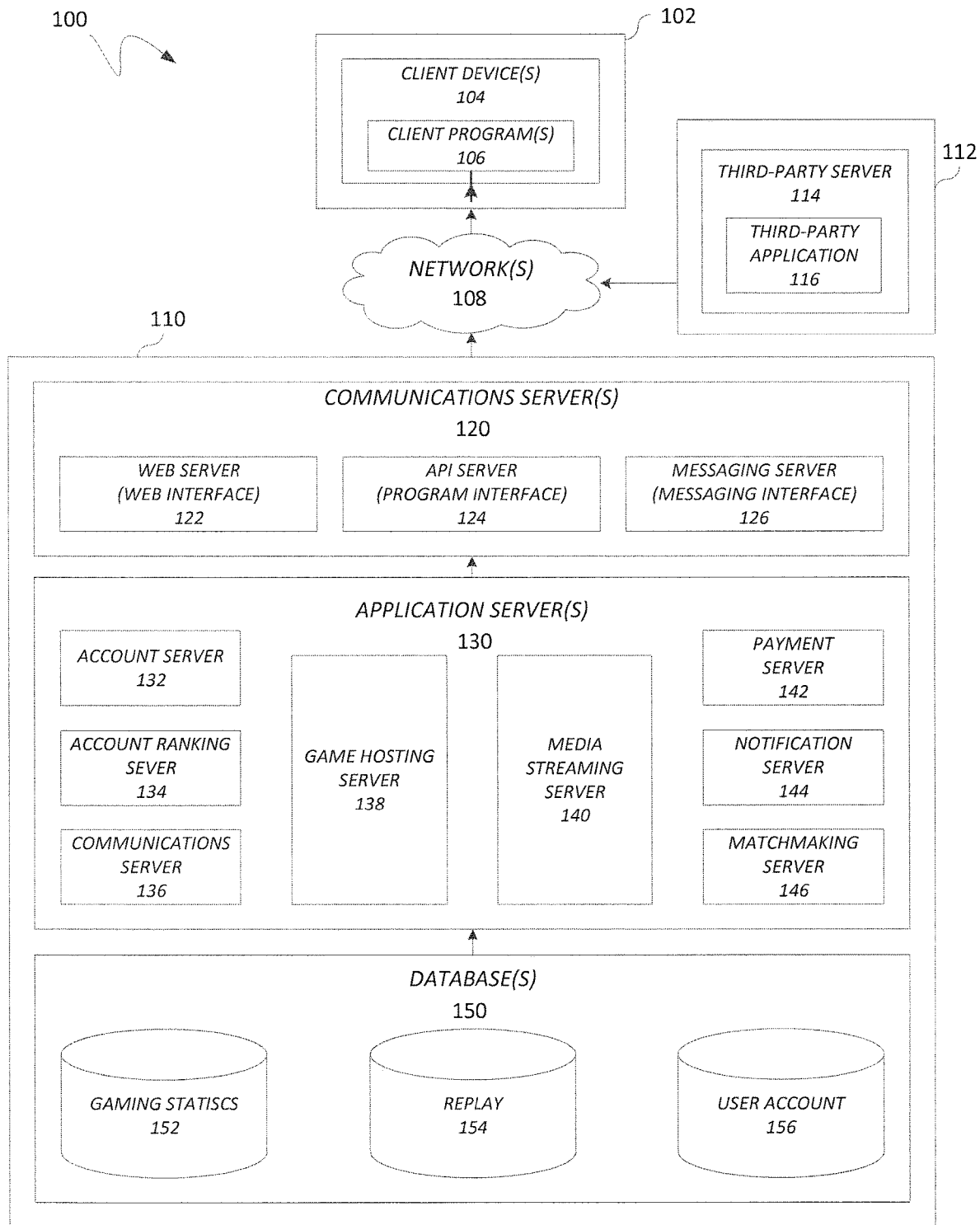
FIG. 1 is a block diagram of an exemplary computing system that is adapted for implementing a system of audience adjusted video games.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method provide audience members of a video game the ability to affect the difficulty of a game. In some examples, the difficulty of the game increases incrementally when there is an increase in the number of viewers, number of monetary donors, points donors, votes, number of subscribers and/or the like. Gaming difficultly may be changed in a variety of ways including, but not limited to, changing character statistics, minion statistics, number of minions, item drops, map sizes, and/or the like.

In some embodiments, a system and method are provided for changing game mechanics to affect the competitive advantage for one or more players in a player vs player (PvP) game. For example, a player with more viewers, subscribers, fans, votes, and/or the like may receive attribute boosts (also referred to as stat boosts). Attributes such as health, defense, attack, and speed build speed, lives, stealth, and/or any other stat. In some examples, the audience may incrementally affect the game mechanics as more and more viewers watch, subscribe, vote, and/or otherwise support a player and/or teams of players. In this manner, players are incentivized to grow their fan base, which in turn may increase ad revenue and/or increase the popularity of a game. Furthermore, an interesting video game dynamic may occur where players who are not as skilled at the game may be able to gain an advantage by growing their channel popularity. A particularly charismatic player with a lot of fans may be supported sufficiently to play competitively against extremely skilled players with fewer fans. In some examples, the skill and popularity of a player may be used to calculate a ranking, and matching system may match the player with other players with similar rankings.

In some embodiments, a system and method are provided for analyzing video game viewership to identify gaming situations that are popular to the viewers. For example, certain maps, races, character combinations, and/or difficulty levels of a game may receive the most views. In some examples, the system and method may increase the odds of popular video game scenarios to reoccur.

In some embodiments, a media display system is provided, the media display system including a first device with one or more processors coupled to a memory. The processor may execute instructions from the memory to perform the steps of receiving a request to begin a video game, streaming video of the video game to an audience, determine a popularity of the streaming video, and changing one or more video game mechanics based on the popularity of the streaming video.

In some embodiments, a computer implemented method of broadcasting a video game is provided. The method may include, receiving a request to begin the video game from a player from a first device, streaming the video game to a second device being viewed by a viewer, receiving an indication from the second device to help the player, and providing help to the player in response to the indication.

In some embodiments, a media display system is provided. The media display system may include a first device with one or more processors coupled to a memory and executes instructions from the memory to perform the steps of identifying a plurality of viewers of a media stream, identifying a preferred game mechanic of the plurality of viewers, receiving a request to start a video game displayed in the media stream, and changing the video game based on the preferred game mechanic.

FIG. 1 illustrates, in block diagram format, an exemplary embodiment of a computing system adapted for implementing a system and method for audience adjusted gaming. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs, gaming programs, and application programs to perform various computing and/or communications operations. Exemplary system programs may include, without limitation, an operating system (e.g., MICROSOFT® OS, UNIX® OS, LINUX® OS, Symbian OS™, Embedix OS, Binary Runtime Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, videogames, web browser applications, messaging applications (e.g., e-mail, IM, SMS, MMS, telephone, voicemail, VoIP, video messaging), contacts applications, calendar applications, electronic document applications, database applications, media applications (e.g., music, video, television), location-based services (LBS) applications (e.g., GPS, mapping, directions, positioning systems, geolocation, point-of-interest, locator), and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed herein.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, video messaging session, and/or other communication applications. Any of a wide variety of suitable communication types between client devices 104 and system 110 may take place, as will be readily appreciated. In particular, wireless communications of any suitable form may take place between client device 104 and system 110.

In various embodiments, computing system 100 may include, among other elements, a third party 112, which may comprise or employ a third-party server 114 hosting a third-party application 116 and third-party devices 118. In various implementations, third-party server 114 and/or third-party application 116 may host applications associated with or employed by a third party 112. For example, third-party server 114 and/or third-party application 116 may enable network-based system 110 to provide client 102 with additional services and/or information, such as online videogame hosting, live video game streams, and/or the like, some of which are discussed herein. Third-party server 114 and/or third-party application 116 may also provide system 110 and/or client 102 with other information and/or services, such as email services and/or information, social networking services and/or information, user statistics and/or other online services and/or information.

In one embodiment, third-party server 114 may include a social networking server that hosts a user's social network account. In another embodiment, third party-server 114 may include an email server that hosts a user's email account. In yet another embodiment, third-party sever 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When configured to implement a system and method for audience adjusted gaming, application servers 130 of network-based system 110 may be a server that provides various gaming services. Application server 130 of network-based system 110 may provide services such as, game hosting, player matching, game streaming and/or recording, messaging, user data gathering, and/or other services. Application servers 130 may include an account server 132, a game hosting server 138, a media streaming server 140, a payment server 142, a notification server 144, and/or a match making server 146. Application servers 130 may further include an account ranking server 134, and a communications server 136. These servers, which may be in addition to other servers, may be structured and arranged to aid in hosting, displaying, and adjusting videogame play in addition to some or all of the other services as discussed above and in more detail below.

Application servers 130, in turn, may be coupled to and capable of accessing one or more databases 150 including a gaming statistics database 152, a replay database 154, and/or user account database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
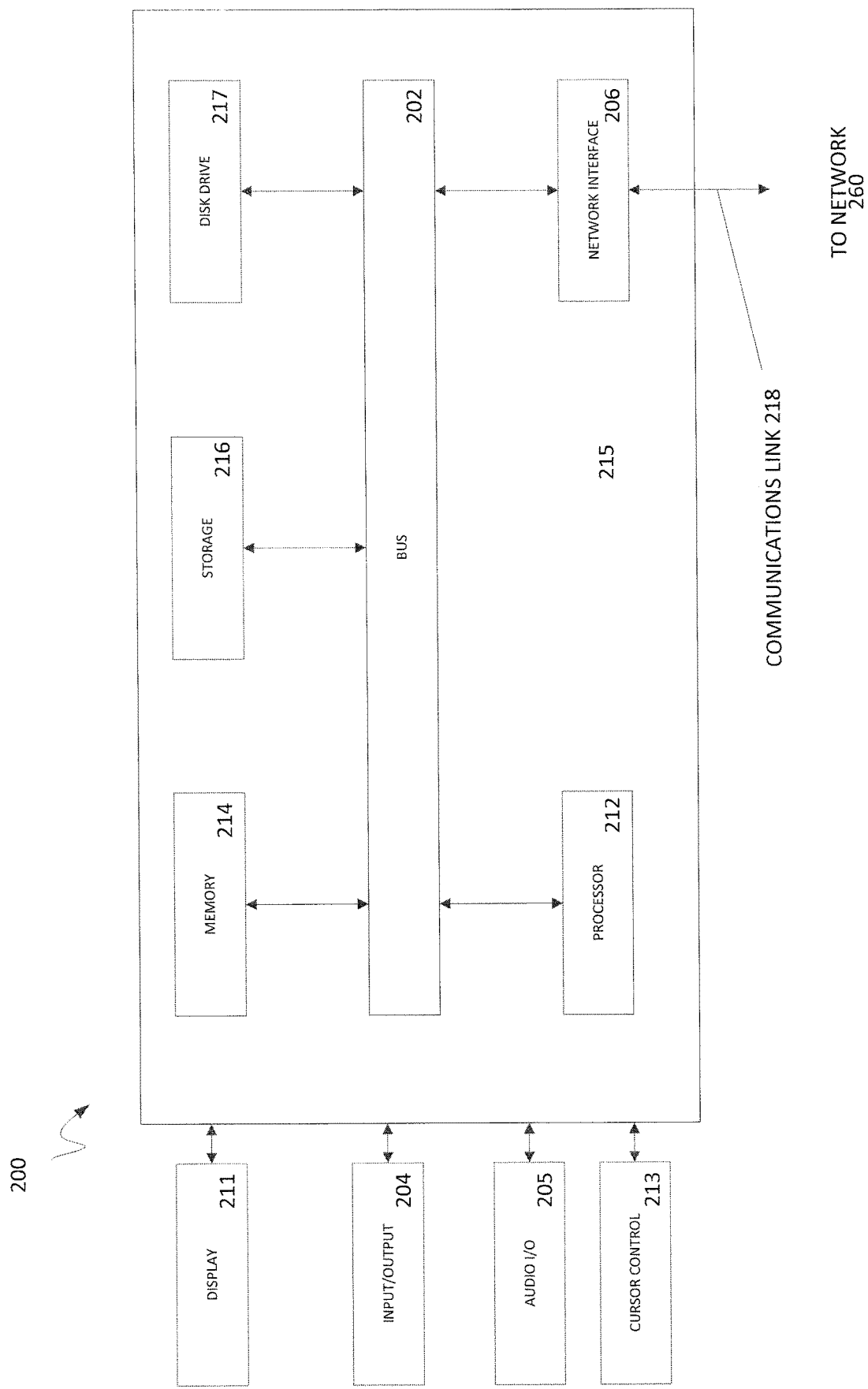
FIG. 2 is a block diagram of an exemplary computer system suitable for implementing one or more devices of the computing system in FIG. 1 and the embodiments in this disclosure.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, Bluetooth device, key FOB, badge, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more methods and/or services, such as the services discussed above and in more detail below.

Figure 3:
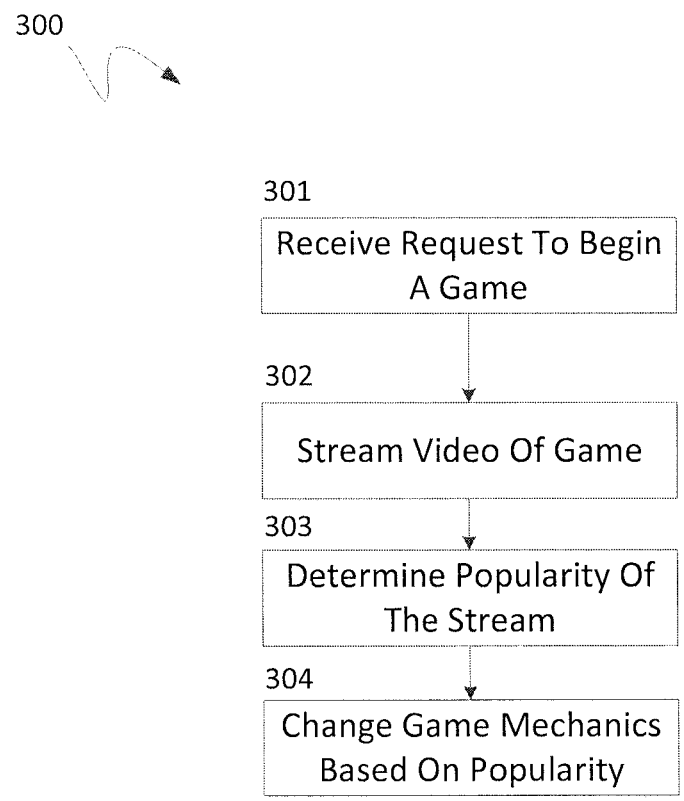
FIG. 3 illustrates a flow diagram of an exemplary method of audience adjusted game mechanics based on the popularity of the player and/or channel.

FIG. 3 illustrates a flow diagram of an exemplary method of audience adjusted game mechanics based on the popularity of the player and/or channel.

At 301, a player and/or a user may request to begin a video game on a system such as network-based system 110 of FIG. 1 using one of the client devices of client devices 104 of FIG. 1. The video game may be a single or multi-player campaign style game wherein a storyline or a set of adventures in the video game is played out by the players with the purposes of reaching the end of the game. In some embodiments, the end of the story line is the end of the game. Many gamers will provide streams and/or replays of quick completions of games often referred to as "speedruns." Speedruns refer to players that rush through the story line of a game to reach completion in the shortest amount of time. Many viewers are interested in speedruns because it allows the viewer to experience the story of the game without having to work through the game themselves.

In some examples, the game may be a PvP game, where the players are pitted against each other competitively. Examples of PvP games include, but are not limited to, real time strategy (RTS) games, first person shooters (FPS), and/or fighting games. PvP games also often have a campaign mode for players to play. Individuals usually watch PvP games for the same type of thrill people get from watching competitive sports matches. PvP games will often have similar dramatic and suspenseful situations are a professional sports match.

In some embodiments, the request to begin a video game may be a login event, such as submitting a username and password for an account to a server. In other embodiments, the request may be the actuation of a virtual button on a user interface used to initiate a game.

At 302, the request received at 301 may trigger a stream and/or broadcast of the player's game. The stream may be a broadcast of a screen region capture, game capture, video camera capture, or a combination thereof. In some embodiments, the video steam may be handled by a third party application installed on the device of the user and sent to a broadcasting server such as media streaming server 140 of FIG. 1 for broadcasting. The broadcast of the game may be available to viewers through a web application, website, phone application, and/or the like.

At 303, the system may determine the popularity of the stream. Determining the popularity of the stream may include determining the number of current viewers and/or subscribers to the channel of the user. In some example, the popularity may be determined by the total number of views. In some example, the system may determine popularity from monetary donations to the channel. As more money is donated to the player, the system may increase its popularity determination for the player.

At 304, the system may change some of the game mechanics based on the popularity determination at 303. In some embodiments, the difficulty of a campaign style game may be incrementally increased until a maximum difficulty is reached. The difficulty of the game can be changed in a number of ways, including, but not limited to, changing in-game character attributes, changing villain and/or minion attributes, changing the number of minions, changing map sizes, changing time limitations, changing the number of missions, change odds of health or helpful item drops in the game and/or the like. In-game characters, minions, villains, heroes, champions and individual army makeup are often referred to as "units".

For example, a character that a user is playing may have a life attribute of 100. The player may lose a game when the life attribute is reduced to 0. To increase the difficulty of the game, the starting life attribute may be reduced in relation to the number of viewers, subscribers, and/or donors. In some instances, the life attribute may be reduced by 1 for every 100 viewers, with a maximum reduction of 50. In this case, the life attribute will reduce until there are 5000 viewers or more, where the maximum reduction is reached at 50.

In some examples the system may aid a player based on the popularity determination, at 303. In a PvP game, fans may support a particular player/team by watching a streaming game from the channel of that player/team. As more fans view, subscribe, or donate to a channel for a user or team, character attributes and/or in-game items to help the team or individual may occur. In this manner, the audience support may affect the outcome of a competitive match. For example, a character that a user is playing may have a DPS attribute of 10. In some instances, the DPS attribute may be increased by 1 for every 100 viewers. Other attributes that may be affected include, but are not limited to, health, defense, movements speed, and/or the like.

Figure 4:
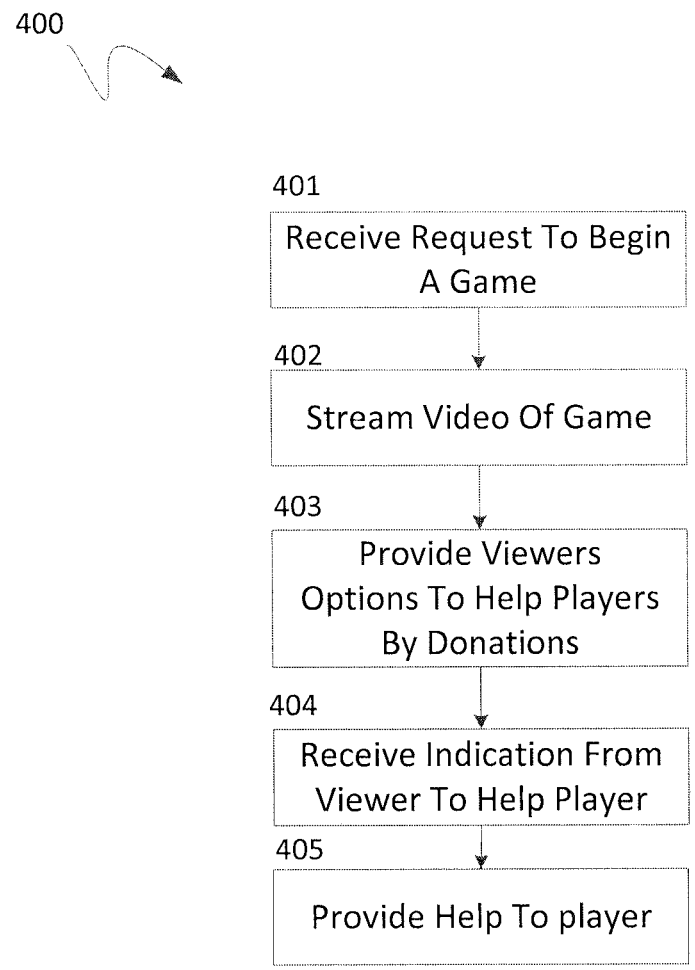
FIG. 4 illustrates a flow diagram of an exemplary method for audiences to aid players streaming a competitive video game.

FIG. 4 illustrates a flow diagram of an exemplary method 400 for audiences to aid players streaming a competitive video game according to an embodiment.

At 401, a player and/or a user may request to begin a video game on a system such as network-based system 110 of FIG. 1 using one of the client devices of client devices 104 of FIG. 1. The videogame may be a PvP game, where players and/or teams of players are pitted against each other competitively. The PvP games may have power up items normally available in the game. Power up items may include, but are not limited to, health potions, weapons, armor, virtual currency, magical items that provide special abilities, and/or the like.

The request may be a login event, such as submitting a username and password for an account to a server. In other embodiments, the request may be the actuation of a virtual button on a user interface used to initiate a game.

At 402, the request received at 401 may trigger a stream and/or broadcast of the player's game. The stream may be a broadcast of a screen region capture, game capture, video camera capture, or a combination thereof. In some embodiments, the video steam may be handled by a third party application installed on the device of the user and sent to a broadcasting server such as media streaming server 140 of FIG. 1 for broadcasting. The broadcast of the game may be available to viewers through a web application, website, phone application, and/or the like.

At 403, the system may provide viewers with the ability to aid and/or hinder a team in the PvP game through a graphical user interface. In some embodiments, the ability to aid and/or hinder a team in a PvP game may require a donation from the viewer. In some examples, the donation may determine how much a viewer can aid or hinder a team.

The ability to hinder and/or aid a player or team in a game may be the ability to change unit and/or character attributes (e.g. increase and/or decrease attack points, damage output, damage per second (DPS), defense points, etc.), change re-spawn times (e.g. increase/decrease re-spawn wait time after a character death by 30 seconds), change movement speeds, change the number of minions and/or the strength of minions, set booby-traps, heal units (e.g. heal units to full life points), damage units (e.g. remove life points), provide item drops (e.g. weapons, health potions, etc.), reveal a portion of the map, reveal enemy plans and/or the like. In some examples, the aid and/or hindrance may be temporary, such as for a short period of time (e.g. less than thirty seconds, a minute, five minutes, etc.), until the end of a match and/or round, until the death of a character or a certain number of deaths, and/or the like. The unit being affected by the aid and/or hindrance may be a unit controlled by a player in the game and/or an opponent to the player in the game. In some examples the opponent may be the system using artificial intelligence. In some examples, the opponent may be another human player.

In some examples, the amount donated may determine the effectiveness of the hindrance and/or aid. For example, a one dollar donation may increase the health of a unit by 100 points, where ten dollars may increase the health of a unit by 1000 points.

At 404, the system may receive an indication from a viewer to help or hinder a player and/or team. The indication may be provided through the actuation of an actuatable element provided in a graphical user interface available to the viewer. For example, the GUI may provide a drop down menu of options for helping or hindering a player and/or team. The GUI may also provide an actuatable element to purchase the option. The purchase may be conducted through a payment provider or transfer funds from the user account using a payment server, such as payment server 142 of FIG. 1. In some embodiments, the payment server may be handled by a third party, such as third-party server 114 of FIG. 1. Some and/or all of the funds may be transferred to the team and/or player being helped and/or hindered.

At 405, the system may provide the help and/or hindrance that were indicated by the viewer at 404. In some embodiments, the system may allow the user to choose when help or hindrance is introduced into the game. In this manner, the viewer may provide help or hindrance at a critical moment in the game.

In some embodiments, method 400 may be applied in a campaign game that is not competitive. Audience members may enjoy disrupting a game by hindering a player or team of players from reaching an objective. This is sometimes referred to as "trolling," with the main purpose of gaining a laugh at the expense of someone else (e.g. a player). In some embodiments, the system may allow users to troll players by adding difficult minions, adding lag, slowing player movement, adding blockades, and changing other game mechanics to generally annoy the players and/or disrupt a game. In some examples, viewers may have to donate to change the game mechanics in a similar manner as described at process 403-404.

Figure 5:
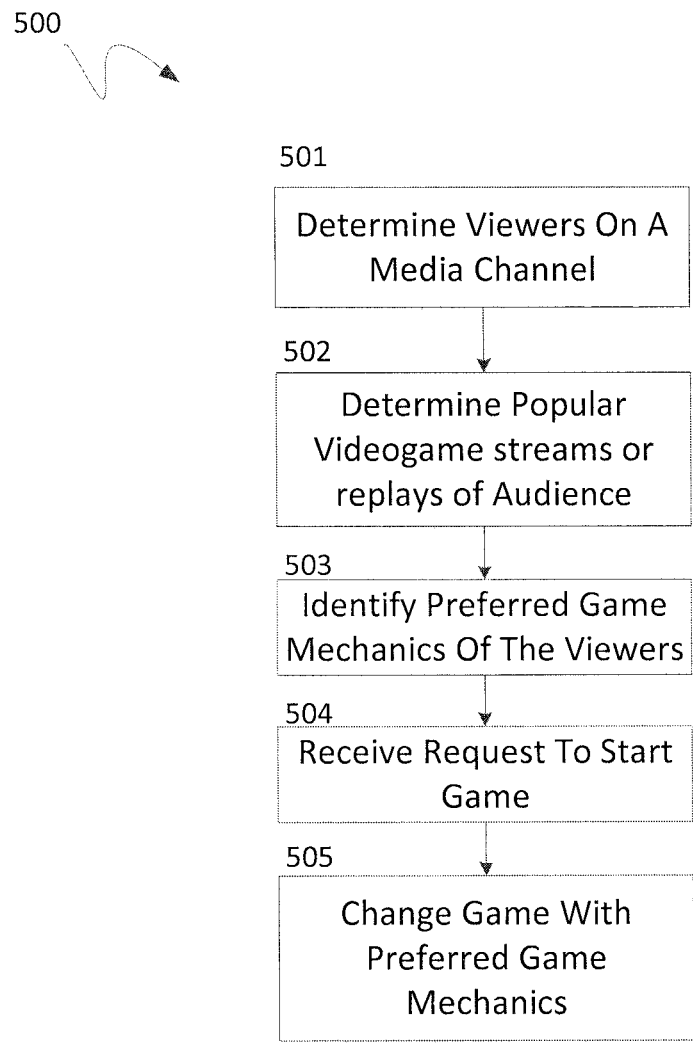
FIG. 5 illustrates a flow diagram of an exemplary method for automatically adjusting game mechanics based on audience preferences

FIG. 5 illustrates a flow diagram of an exemplary method 500 for automatically adjusting game mechanics based on audience preferences. Much like sports, viewers have opinions on how video games should be adjusted for optimal entertainment. Some viewers may be interested in short, action packed games with constant battling. Another group of viewers instead of action packed games may be more interested in slow, defensive, and technical games. A system implementing method 500 may tailor games based on the audience viewing the game.

At 501, the system may determine which viewers are viewing a video game stream and/or media channel. In some embodiments, users may be required to log into an account to view a stream and the system may determine which accounts are accessing the stream.

At 502, the system may access a database of recorded user history, such as user account database 156 of FIG. 1, and determine which streams and/or replays of games the user accounts watched. The system may determine which streams and/or game replays are popular amongst the audience. In some embodiments, the system may also check viewing times and/or how much of a stream and/or replay was watched to determine which streams or replays of games were the most engaging. The system may determine that viewers enjoyed streams or replays of game plays that were watched for longer periods of time and/or viewed the entirety and/or majority of the game play. In some embodiments, users may be able to vote (e.g. thumbs up or thumbs down) on streams and replays that the audience liked or disliked. The system may track the history of the up and down votes of users to determine which games the viewers are most interested in. The system may track game mechanics of each game stream and or replay, such as maps, characters, game length, units, races played (in some games players are able to play different races such as orc, human, etc.), and/or the like. In some embodiments, users may also fill out a questionnaire regarding the viewing preferences and game mechanic preferences of the user. The questionnaire may ask questions such as, favorite character race, player, map, power-ups, weapons, and/or the like. The questionnaire may also be used in determining the viewing preferences of a viewing audience. In some embodiments, the questionnaire may be provided as part of a user profile when an account is initially created.

At 503, the system may identify preferred game mechanics of the viewers. In some examples, preferred game mechanics are determined by common elements from the game statistics of the most popular streams and/or replays. For example, the system may determine that the most popular games used (or did not use) smaller maps, certain characters, and/or certain weapons. In some embodiments, the determination may be made by analyzing the historic votes, watching history, and/or questionnaires of the audience. For example, the replay and/or stream with the most up votes may be considered the most popular. In some examples the system may count up votes and down votes and subtract the down votes from the up votes to determine popularity.

In some embodiments, the system may count maps, characters, game times, and/or other game mechanics from well liked game plays. Well liked game plays may be game plays with above average up votes, game play watching time, and/or game plays commonly watched by most of the viewers.

At 504, the system may receive a request to begin a game. The request may come from one or more players, and/or one or more moderators for a game. The game may have a randomizer that randomizes certain mechanics of the video game, such as which map is played, the races of the player, spawning areas, starting weapons, and/or the like.

At 505, the system may set the game mechanics with the common elements determined at 503. For example, the audience may have a preference of a larger map. The system at 505 may increase the odds of a larger map being used from a pool of maps, and/or use a map that is determined to be the most popular at 503. Other game mechanics that may be changed by the system may be game speed. The system at 503 may determine that the users are interested in relatively short games and the system may, to shorten a game, increase movement speeds, attack speeds, and/or attack damage of units in the game.

Figure 6:
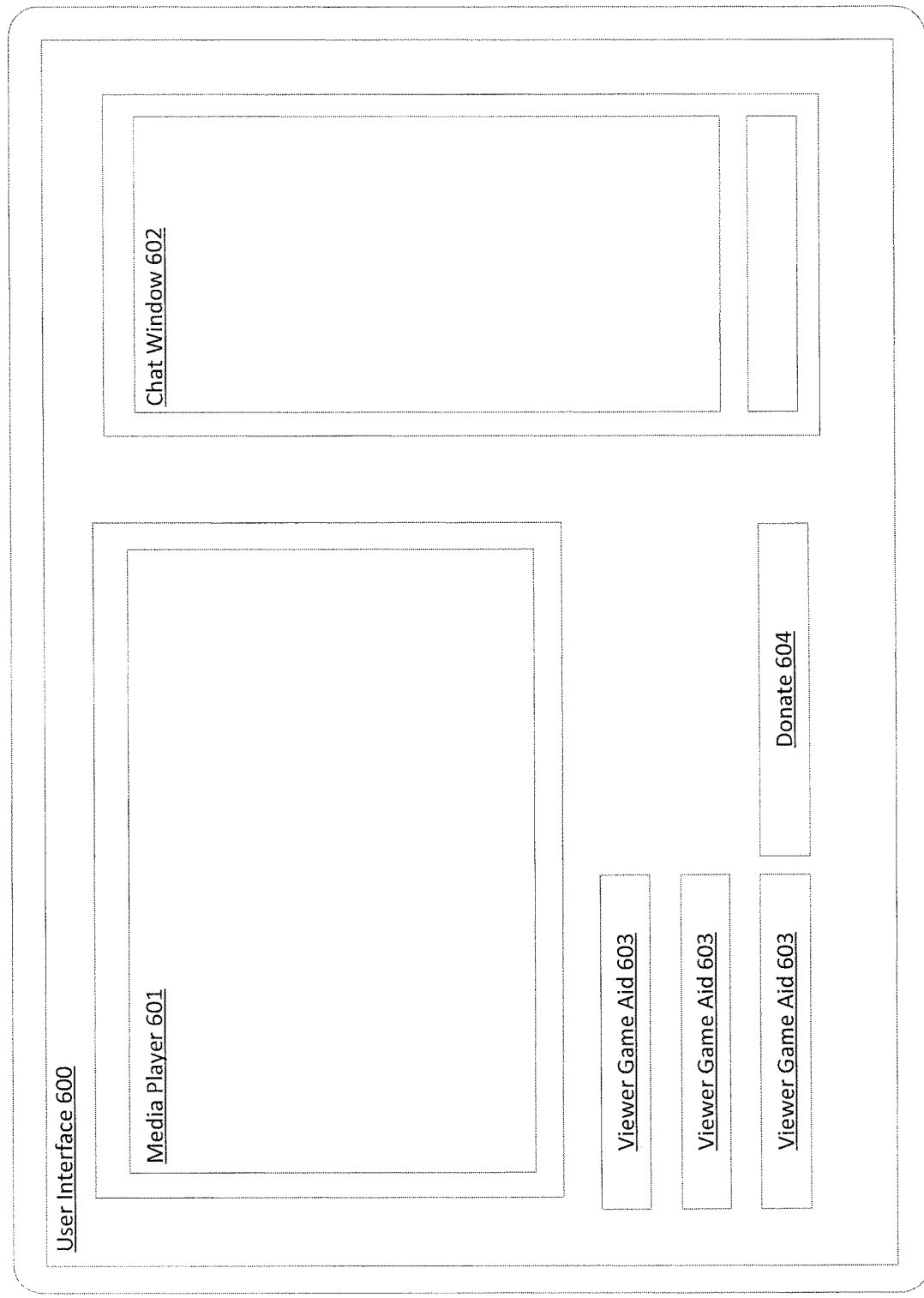
FIG. 6 illustrates an exemplary user interface that may be used with a system and method of audience adjusted game mechanics.

FIG. 6 illustrates an exemplary user interface 600 that may be used with a system and method of audience adjusted game mechanics, such as method 400 of FIG. 4. In some embodiments, user interface 600 may be presented to one or more viewers of a streaming video game by a player. In some embodiments, user interface 600 may be an interface displayed within a web browser connected to a web server, such as web server 122 of FIG. 1. In some embodiments, user interface 600 may be an interface displayed by an application, such as client program 106 of FIG. 1, on a user device, such as one of client devices 104 of FIG. 1.

User interface 600 may have a media player 601 for displaying a video game being played by one or more players and/or players of a video game. In some examples, media player 601 may have actuatable elements (not shown) which allow a user to pause, play, rewind, and/or fast forward the media. There may also be volume controls and/or video quality controls (e.g. ultra high definition, high definition, low quality, etc.).

In some embodiments, user interface 600 may have a chat window 602 where viewers and/or players may engage in a textual discussion in a public and/or private chat forum. In some examples, chat window 602 may be a private chat window where only people who are invited, such as friends, may view and join the chat session. The chat window may have moderator controls, such as the ability to kick out, ban, invite, and/or mute other users. In some embodiments, the moderator controls may be conducted through textual commands that are entered into the chat. In some examples, the moderator controls may be actuatable elements (not shown) that are a part of chat window 602.

User interface 600 may display several actuatable elements 603 which, when actuated, allow a user to pick an aid or hindrance, such as the aids or hinderances discussed above in relation to FIG. 4, that can be applied to one or more players and/or teams playing the game being displayed in media player 601. The actuatable elements may be virtual buttons on the user interface. In some embodiments aiding or hindering a player or team playing a game may require a donation of currency, game points, game coins, and/or the like. To facilitate the donations, there may be a donate button 604 which allows the user to donate and/or transfer money to a team and/or player. In some embodiments, actuating one or more actuatable elements 603 may enabled through a donation and/or money transfer. The donation button, when actuated, may request more information, such as the choice of a payment provider, payment account information, credit card numbers, and/or the like. In some examples, the donate button may retrieve funds that are already present in and/or related to a user account. The actuating donate button 604 may then be used to transfer funds from the user to one or more players playing the videogame displayed in media player 601.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
one or more processors; and
a memory coupled to the one or more processors and storing instructions that, when executed by the one or more processors, perform operations, comprising:
transmitting data associated with a game to one or more computing devices over a network, wherein the game includes one or more game mechanics;
receiving, from at least one of the one or more computing devices, a subscriber preference for the game associated with the transmitted data;
determining a set of preferred game mechanics of the game based on the subscriber preference; and
changing at least one of the one or more game mechanics of the game based at least in part on the determined set of preferred game mechanics.

2. The system of claim 1, wherein the subscriber preference includes a popularity of the game.

3. The system of claim 1, wherein the subscriber preference includes a donation to a player of the game.

4. The system of claim 1, wherein the data associated with the game includes video data.

5. The system of claim 1, wherein the one or more game mechanics include a level of difficulty of the game based at least on:
in-game character attributes,
a number of minions,
odds of health of a player in the game, and
time limitations of actions by the player.

6. The system of claim 1, wherein the subscriber preference includes distracting a player of the game through trolling.

7. The system of claim 6, wherein the trolling includes one or more of:
adding to the game a number of minions for following the player;
adding a time lag to a motion of the player; and
adding one or more blockades for interfering with the motion of the player.

8. The system of claim 1, the operations further comprising:
interactively receiving the subscriber preference, wherein the subscriber preference includes hindering a player in the game; and
determining the set of preferred game mechanics of the game by increasing a level of difficulty of the game for the player.

9. A method, comprising:
transmitting data associated with a game to one or more computing devices over a network, wherein the game includes one or more game mechanics;
receiving, from at least one of the one or more computing devices, a subscriber preference for the game associated with the transmitted data;
determining, by one or more processors, a set of preferred game mechanics of the game based on the subscriber preference; and
changing, by the one or more processors, at least one of the one or more game mechanics of the game based at least in part on the determined set of preferred game mechanics.

10. The method of claim 9, wherein the subscriber preference includes a popularity of the game.

11. The method of claim 9, wherein the subscriber preference includes a donation to a player of the game.

12. The method of claim 9, wherein the data associated with the game includes video data.

13. The method of claim 9, wherein the one or more game mechanics include a level of difficulty of the game based at least on:
in-game character attributes,
a number of minions,
odds of health of a player in the game, and
time limitations of actions by the player.

14. The method of claim 9, wherein the subscriber preference includes distracting a player of the game through trolling, wherein the trolling includes one or more of:
adding to the game a number of minions for following the player;
adding a time lag to a motion of the player; and
adding one or more blockades for interfering with the motion of the player.

15. The method of claim 9, the method further including:
interactively receiving the subscriber preference, wherein the subscriber preference includes hindering a player in the game; and
determining the set of preferred game mechanics of the game by increasing a level of difficulty of the game for the player.

16. A method, comprising:
receiving, from a remote computing device, a first set of game mechanics of a game;
interactively providing, based on the received first set of game mechanics of the game, content of the game;
interactively generating, by one or more processors, a subscriber preference, wherein the subscriber preference includes a request from a subscriber to change one or more game mechanics associated with a player in the game;
transmitting the subscriber preference;
receiving, from the remote computing device, a second set of game mechanics of the game, wherein the second set of game mechanics is based on the transmitted subscriber preference, and wherein the second set of game mechanics is distinct from the first set of game mechanics; and
interactively providing, based on the received second set of game mechanics of the game, a revised content of the game.

17. The method of claim 16, wherein the subscriber preference includes a donation to the player in the game.

18. The method of claim 16, wherein the game includes a video streaming game.

19. The method of claim 16, wherein the first set of game mechanics include a level of difficulty of the game based at least on:
in-game character attributes,
a number of minions,
odds of health of the player, and
time limitations of actions by the player.

20. The method of claim 16, wherein the subscriber preference includes distracting the player in the game through trolling, wherein the trolling includes one or more of:

adding to the game a number of minions for following the player;
adding a time lag to a motion of the player; and
adding one or more blockades for interfering with the motion of the player.

* * * * *